Jan. 27, 1970 R. S. LECOANET 3,492,445

SWITCHING INSTALLATION SUPERVISION SYSTEMS

Filed Dec. 20, 1965 2 Sheets-Sheet 1

SWITCHING INSTALLATION SUPERVISION SYSTEMS

Filed Dec. 20, 1965 2 Sheets-Sheet 2

United States Patent Office 3,492,445
Patented Jan. 27, 1970

3,492,445

SWITCHING INSTALLATION SUPERVISION SYSTEMS

Roland S. Lecoanet, Antony, France, assignor to International Standard Electric Corporation, New York, N.Y., a corporation of Delaware Filed Dec. 20, 1965, Ser. No. 514,985
Claims priority, application France, Dec. 24, 1964, 999,923
Int. Cl. H04m 3/22
U.S. Cl. 179—175.2 2 Claims

ABSTRACT OF THE DISCLOSURE

A fault analyser for a telephone exchange is equipped with means for determining whether a fault has occurred and for making a temporary recording of each detected fault. Comparison equipment then checks the temporary recording of each detected fault by connecting the recording to a standard circuit to see whether the recorded fault falls within a selected class of faults. If the fault falls within the selected class, a permanent record in the form of a punched card is then made; if not, no card is made and the temporary memory is erased. The means for establishing the classes of faults are in the form of replaceable plug-in panels which enable great flexibility in establishing which faults are to be permanently recorded.

This invention is concerned with improvements to switching installations supervision systems, and more particularly to systems for registering, or recording, failures in telephone exchanges or similar offices.

In United States Patent No. 2,787,328 to F. P. Gohorel there is described a registration system for incidents that occur in a telephone exchange. The main control units in an exchange, i.e. the registers, markers, etc. each have a control circuit which concludes that a fault has occurred when, its time being over, an operation stage is not finished. This control circuit then locks the operation of the unit and, possibly also the associated units at the time of the fault, and a call is sent towards a fault register.

The fault register is composed of a unit finder and one or more temporary memories. When a call comes, the unit finder positions itself on the unit in fault and causes in this unit, the energization of a relay for connection to the memories. At the same time, a free memory is designated to answer the call. The contacts of the connection relays applied in the faulted unit enable the transmission toward memory of indications on the state of main circuits which are locked following discovery of the fault. The indications transmitted are registered in the memory at the same time as other useful information, such as the identity of the unit concerned. If necessary, the fault register can proceed to the identification of the calling subscriber and of the called line the numbers of which are also registered in the memory.

When all this information is registered in the memory, the units are disconnected from the fault register which causes the circuits to be unlocked and the operating process to be resumed if possible, or else general release is brought about.

When a temporary memory receives the information concerning a fault, it emits a call towards a registering apparatus such as a card punching machine. As soon as the punching machine is free, it connects itself to the memory and sets up a punched card in agreement with the registered information. Next, the temporary memory is released and so is the punching machine.

The punched cards established by the fault registration system are used by maintenance personnel for determining the causes of the various troubles.

This system gives full satisfaction when it is used in normal conditions, i.e. when the faults are not too frequent. The use of the cards, in convenient number enables swift localizing and noting of the faults. But it can occur that the number of faults is high and that the registration system produces so many cards that they cannot be used. The present invention has for a primary object, the provision of means for dealing with this situation.

The exchanges built now have a low rate of trouble. But a new exchange can be connected in a big town's network, to old ones that are responsible for a large number of incidents. The corresponding punched cards are useless as the faults have causes from outside the considered exchange. It is, therefore, an object of the invention to provide a system able to prevent the registration of faults of this kind for which there is no remedy.

Besides, during the test period and final inspection stage, before cut-over, the incident registering system is usually not used. The faults are numerous and their detection from punched cards would be too elaborate. In addition, the adjustments are effected by following a determined program and the larger part of punched cards produced would not be used. It is an object of the invention, by a selection of faults that could originate a punched card, to enable the use of the fault registering system even during the final inspection of a new exchange.

On the other hand, when it is wished to identify the cause of a determinate trouble, it is often desirable to proceed to lock the chain of units concerned at the moment a fault appears, without however perturbing the normal operation of the exchange and of the fault registering system. It is an object of the invention to enable this locking without perturbing the operation.

Although there has been described different functions of the invention and different objects of the invention in relation to a particular fault registering system, these devices constructed in accordance with this invention can be used with any fault registering system with one or more memories to increase the possibilities of use by preventing the registration on punched cards of faults for which there is no remedy and which are not to be processed right away.

One of the features of the invention is a system of fault registration comprising mainly one or more temporary memories for registering the information concerning the faults and a permanent registering device receiving the information registered in the temporary memories, as well as a control device comprising means for displaying one or more determinate fault configurations constituted by indications corresponding to one or more determinate faults, means for reading on the temporary memory(ies) the registered information, means for comparing the registered information, and the configuration of displayed faults and means responding to the coincidence between the information registered and one of the configurations displayed to authorize or prevent the permanent registration of information and if necessary order the locking of the units in fault.

According to another feature of the invention, the registration of information concerning a fault is effected by the marking of certain registering conductors and the display of configurations corresponding to the same fault. This has for effect to connect one or more sensitive devices to the same registration conductors, so that when a fault occurs the temporary registering leads to mark all the registration conductors to which are connected the sensitive devices of the configuration considered which all taken on a determined state characterizing the coincidence between the registered information and the displayed indication.

According to another feature of the invention, the control device comprises several individual comparison equipments, each of them permitting the display of a fault configuration and comprising sensitive devices to detect the coincidence between the displayed configuration and the information that appears on registration conductors.

According to another feature of the invention, the sensitive devices are comparison relays connected to certain registration conductors by means of display contacts controlled by a display device such as a plug board or a punched card reader for each individual comparison equipment.

According to another feature of the invention the positions of the comparison relays of an individual comparison equipment are combined in such a way as to furnish a signal every time the registered items of information are in accordance to the displayed configuration.

According to another feature of the invention the concordance signal is transmitted either to a rejection circuit or an accepting circuit, by means of a switch set in position at the displaying of the fault configuration according as the permanent registration of the fault must be, particularly, refused or accepted.

According to another feature of the invention, the order for rejection transmitted by an individual comparison equipment always causes the cancellation of the temporary registration and forbids permanent registration, which erases any trace of the corresponding fault.

According to another feature of the invention, the order for accepting transmitted by a comparison equipment always has for effect to hold the temporary registration and permit the permanent registration of the information concerning the fault described by the displayed configuration.

According to another feature of the invention, the control device has a switch to control the general refusal of registered faults, so that permanent registration is made only for faults for which individual comparison equipment gives the acceptance signal.

According to another feature of the invention the said switch of the control device, in another position orders the general acceptance of the registered faults, in such a way that only the faults for which individual comparison equipment gives a rejection signal are not registered permanently.

According to another feature of the invention the control device also has a second switch which, in an active position, controls the locking of the units involved in a fault when one of the individual comparison equipments gives an acceptation signal, so that whatever be the general handling of the faults, certain predetermined faults cause a permanent locking of the implied units, so as to enable immediate repairing by maintenance personnel.

Various further features will be disclosed in the following description which is given by way of a non-limited example and by reference to the accompanying drawings, in which:

FIGURE 1 represents the block diagram of a well-known telephone exchange the control circuits of which are connected to a fault register END equipped with a card punching machine PER.

Figure 1:
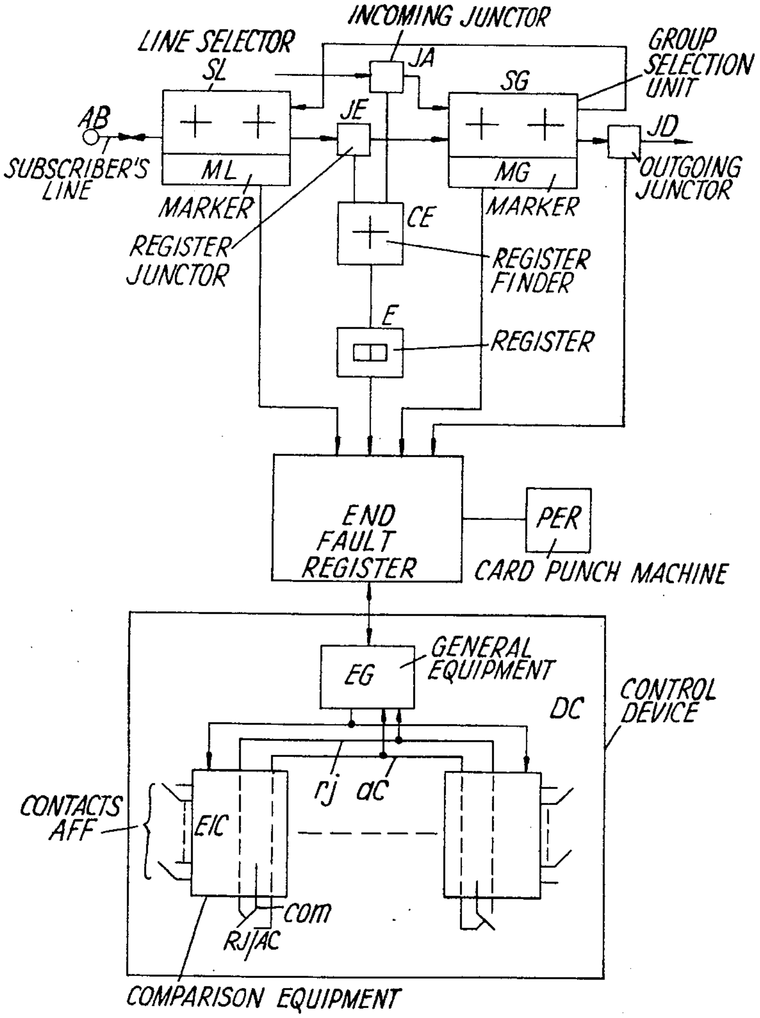
FIGURE 1 is a block diagram of a telephone exchange equipped with a system for registering the incidents with the control device in accordance with the invention.

The subscribers' lines such as AB are connected to outlets of line selection units such as SL with two stages of crossbar switches controlled by one or more markers such as ML. When the subscriber AB picks up his handset, its line is connected to a register junctor such as JE through the selection unit SL. The register junctor JE is connected at the same time to a free register such as E, through intermediary of a stage of register finders CE.

Register E sends the dial tone, receives the digits dialed by the calling subscriber and achieves the selections. We first assume that the calling subscriber calls a subscriber of the same exchange. The first digits received by the register E are used for connecting the junctor JE to an inlet of a line selection unit such as SL to which is connected the called subscriber line. This connection is established through a group selection unit such as SG. It is controlled by a marker such as MG to which the register E gives the necessary information. When the register junctor JE is connected to the inlet of the line selection unit SL and as soon as the register has received all the digits of the called subscriber's number, the junctor JE is connected to the called subscriber by means of the line selection element SL. The call is then established and the register junctor is disconnected from the register which is released.

Each of the incoming lines, coming from another local or distant exchange is equipped with an incoming junctor JA. When a call is received on an incoming line, the junctor JA is immediately connected to a registor E through the stage of register finders CE. Then the operation is about the same as for a local call.

When the calling subscriber calls a subscriber belonging to another exchange, the group selection unit connects the register junctor JE to an outgoing line of the called line. Each of the outgoing lines is equipped with an outgoing junctor such as JD. This junctor is meant to transmit and to receive the different signals necessary to operation, as well towards the remote exchange as towards the calling subscriber (free subscriber, busy subscriber, lifting the handset of the called subscriber, release, etc.)

If the exchange must handle transit traffic an incoming junctor JA can be connected to an outgoing junctor JD through a group selection element SG.

The establishment of calls is constantly supervised, particularly in the registers. If a stage of operation does not occur in a predetermined period, a timing circuit operates, stops the operation and signals the trouble. At this moment the register can be ocnnected not only to the calling line but to a marker ML or MG or to an outgoing junctor JD. The cause of the fault can be in one of these units or in the register itself. A fault is also possible in a marker while it is making a selection, whether a register is connected to it or not.

In any case, when a fault occurs, the unit that notices the fault locks and calls a fault register END. When it answers, the unit that has noted the fault and possibly the units which are associated with it are connected to the fault register END to transmit to it all the information they have. The fault register END stores the information received in a memory then the units out of order are disconnected; their operation is resumed if possible. If not, they are all automatically released.

Later on, the fault register END starts its punching machine PER and sets up a punched card containing all the information stored by the memory which is thus registered in a permanent way.

In an installation equipped with a fault registration system such as above described, a punched card is normally set up for each of the troubles that occur in the exchange. As previously explained this way is not always suitable. The invention is concerned with a control device which is added to this known installation for enabling intervention in the process of establishment of punched cards.

This control device, represented at DC, comprises general equipment EG and one or more individual comparison equipments such as EIC. The equipment EIC is equipped with a set of display contacts AFF controlled, for example, by plugging into the jacks of a panel which has the shape of an enlarged punched card, a jack and a contact being provided at the place of each perforation.

When one wishes to detect the coming of a determinate fault a corresponding fault configuration is displayed on equipment EIC. For doing this, plugs are thrust into the jacks located at the place of the perforations of a card registering this fault. More perfected means can also be employed. For example, one can use a punched card reader with as many peckers as a card contains perforation places and introduce therein a card set up when the fault to be detected has already occurred. Certain peckers are thrust in, others go through the perforations and control the closing of contacts AFF. Several identical equipments are available in order to display several configurations and detect the apearance of several faults.

Every time trouble occurs, general equipment EG is notified and it draws into service the different individual comparison equipments. At the moment the information concerning the trouble is sent to the fault register, the control device reads it and the information is compared in each individual equipment to the displayed configuration. If no comparison gives any result the control device controls no action and the information received by the fault register is finally translated into the form of a punched card.

It is also possible to adopt the reverse operation and take the necessary steps so that the troubles which cause no answering from the control device will not systematically originate punched cards.

If the EIC equipment detects the coincidence of the information received by the fault register and the configuration formed by contacts AFF, it produces an outgoing signal over wire *com* transmitted, according to the position of the switching RJ/AC over wire *rj* or wire *ac*. The switch RJ/AC is set in position at the moment of the display of the configuration, in order to indicate whether the corresponding fault must be rejected in any case, i.e. whether not to originate a punched card or be accepted and originate a punched card.

These two wires *rj* and *ac* are connected to general equipment EG which receives from an individual equipment a signal on one or the other wire and controls through operation of the fault register the execution of this decision.

If operation necessitates doing a punched card per fault the control device thus controls the rejection of the faults identified by the individual equipment(s) which supply a signal on wire *rj*.

If operation provides for not setting up a punched card, the control device controls the setting up of a punched card for all the faults identified by the individual equipment supplying a signal over wire *ac*.

On the other hand, it will be seen that it is also possible, whatever the operation may be, to order the locking of the units in fault when individual equipment gives an outgoing signal over wire *ac*; while causing the setting up of a punched card.

Figure 2:
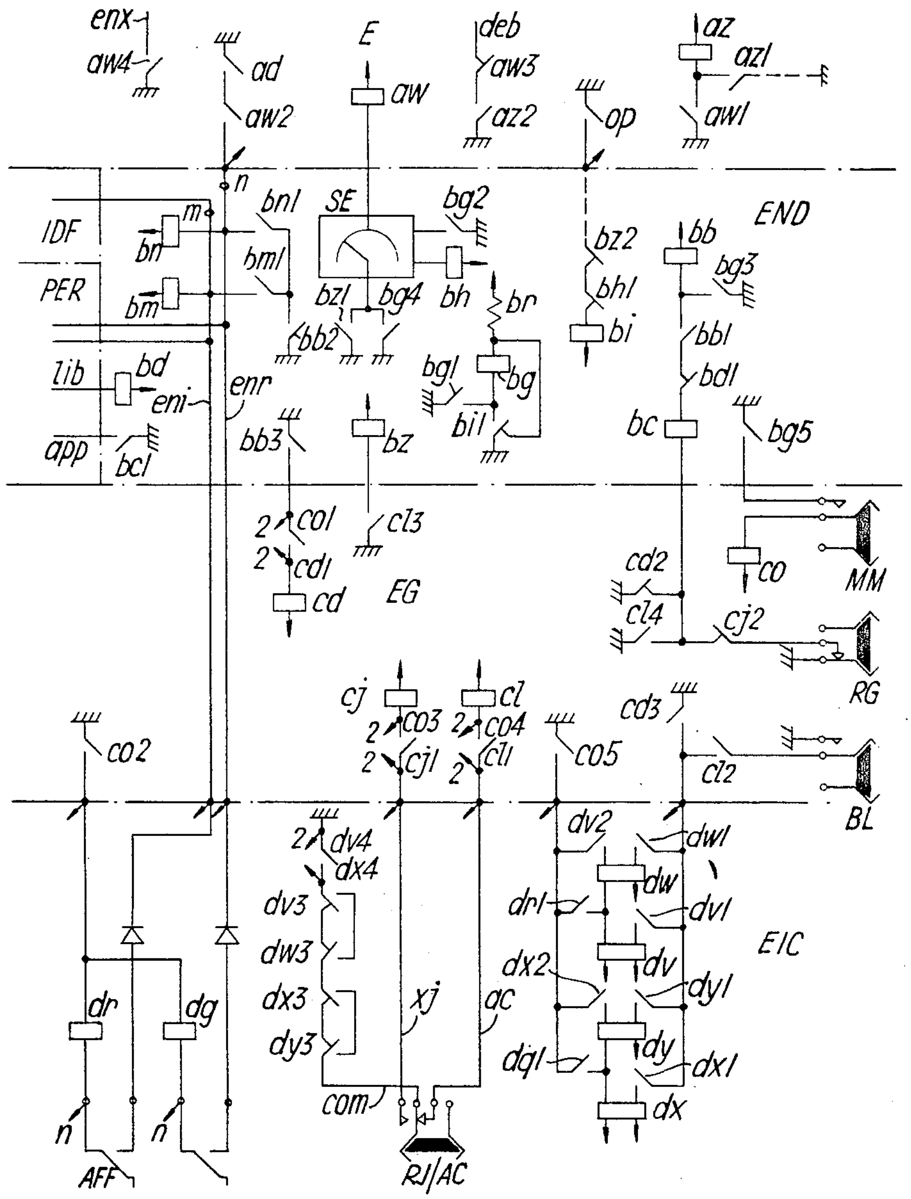
FIGURE 2 is a detailed diagram of a simplified embodiment of a fault registration system with control device shown in FIGURE 1.

Now will be described the detailed operation of an exemplary embodiment of the invention conforming with the block diagram of FIGURE 1 whose schematic drawing is shown in FIGURE 2. In the two figures the same elements bear the same references.

These circuits are realized by means of relays and diodes. A relay is represented by a rectangle. It has one or two windings the terminals of which are located on either side of the rectangle and, it is referenced by two small letters. According to the detached contact representation, contacts of the relays are arranged at any place on the drawing. They bear the reference of the relay that controls them followed by a digit. Besides, the first letter of these reference marks is *a*, *b*, *c*, *d*, for the four parts of the drawing from top to bottom. For example, relay *bc* is in the fault register END and it bears a contact *bc*1 which serves to send an earth to the punching machine PER.

It is also worth noting that the circuits are fed by a same current generator, a battery, for example, the positive terminal of which is earthed. All the circuits that lead to the other terminal of this battery are terminated by an arrow.

We shall first assume that the control device DC constituted by the equipment EG and other equipments such as EIC is not in service and describe the operation of the fault register when a fault appears.

The main units of the installation are equipped with a supervision circuit (not represented) which detects the occurrence of faults, generally from the excess of the time allowed for an operation. This supervision circuit, when a fault is detected closes contact *ap* and locks at the same time the considered unit and the units that may be associated. The chain of units which concur in the establishment of a call thus remains in the situation it was in at the moment of the fault.

The contact *ap* applies an earth causing the energization of relay *bi* in the fault register END on the condition it is available, which means that its circuit must be continuous and especially that the contacts *bh*1 and *bz*2 must be at rest. The multipling arrow shows that this call circuit is common to all the units that detects the troubles.

Relay *bi* energizes and following the operation of its contact *bi* 1, causes the energization of relay *bg*. Relay *bg* gives itself a holding circuit by its contact *bg* 1. By its contact *bg* 3, it causes the energization of relay *bb* and, by its contact *bg* 2 operates selector SE. Contact *bg* 5 remains without effect because the start button MM of equipment EG is assumed to be in rest position, represented by the drawing.

Selector SE symbolically represented in the form of a rotating switch can be realized in any appropriate way and wired to position itself automatically on the calling unit. One could, for example, use to this end one or more selectors of crossbar type. When the selector SE is positioned, the earth supplied by contact *bg* 4 is transmitted to the selected unit in which relay *aw* energizes. Relay *az* is energized when contact *aw* 1 closes, and holds by its contact *az* 1 and a non-shown circuit.

Connection relay *aw*, by contacts such as *aw* 2 connects to register wires *enr* contacts such as *ad*, some open, others closed, indicating the situation of the main circuits of register E. Closed contacts *ad* thus apply an earth to the corresponding *enr* wires.

In fault register END, each register wire *enr* is connected to a memory relay such as *bn*. If the wire to which is connected relay *bn* is marked by an earth, relay *bn* energizes. The earth is immediately held on this wire by contacts *bb* 2 and *bn* 1. The marking earth supplied by register E can then disappear from the considered conductor, it is held by contact *bn* 1 of the memory relay. It is the same with each of the marked register conductors.

If, at the moment of the fault, register E is connected to other units liable to supply interesting information, the earth sent over wire *enx* by contact *aw* 4 causes in these units the energization of connection relays similar to *aw* of which contacts such as *aw* 2 connect to some other wires *enr* the marking earths characterizing the situation of these associated units.

Besides, following controls not represented and by means which are outside the scope of the invention, an identifier IDF can supply, on *m* wires *eni*, marking earths giving, for example the number of the calling subscriber. The registering is done in the way that has just been described by means of memory relays such as *bm*.

On the other hand, as soon as selector SE is positioned over the unit in trouble, relay *bh* is energized. The opening of contact *bh* 1 breaks the circuit of relay *bi* which de-energizes. The availability of the fault register is broken. The operation of contact *bi* 1 breaks the preceding energization circuit of relay *bg* which remains held by its own contact *bg* 1, and short-circuits the winding of this relay. As is well-known, relay *bg* returns to normal when is spent the time for the self-inductance of its winding to be discharged. The registration of the available information on the memory relays is done during this delay time.

When relay *bg* releases, contacts *bg* 2 and *bg* 4 are open which causes relays *bh* and *aw* to de-energize.

In register E, relay *aw* being released while relay *az* still holds, an earth is applied to wire *deb*, by contacts *az* 2 and *aw* 3. This earth controls the unlocking of the register and if required, of the associated units. The operation of the register is resumed if possible, the interrupted selections being for example resumed; otherwise, the register and all the units used for the call having been affected by the fault are released.

Although contact *bh* 1 closes when relay *bh* de-energizes, other contacts, not represented, hold busy the fault register by breaking the circuit of relay *bi*.

When contact *bg* 3 opens, relay *bb* finds a hold circuit through relay *bc* and contact *cd* 2 of the general equipment EG. Relay *bc* energizes. It closes its contact *bc* 1 and applies an earth to wire *app* to the card-punching machine PER. As soon as the punching machine is available, it starts setting up a punched card according to the information marked on the register wires *eni* and *enr*. When the card is finished, the punching machine sends an earth over wire *lib*, which causes the energization of relay *bd*. The opening of contact *bd* 1 breaks the circuit of relays *bb* and *bc* which release. The opening of contact *bb* 2 breaks the earth of the register circuits and the memory relays at make also release.

The fault register is released after the punched card is made out. The circuit of relays *bi* is re-established by non-represented means, to enable the registering of new faults.

We shall now assume that the control device is in service, button MM being depressed and its contact establishing the circuit of relay *co*. It will also be assumed that buttons RG and BL are in the position represented on the drawing.

Operation is unchanged in register E and in the fault register END until relay *bg* releases.

As soon as relay *bg* is energized, relay *co* of the general equipment is energized by the closure of contact *bg* 5. It closes contact *co* 1 so that relay *cd* energizes after relay *bb* and then holds independently from relay *co* by its contact *cd* 1.

The closure of contact *co* 2 supplies an earth to all individual comparison equipment such as EIC. The multipling arrows show that all the indivdual comparison equipment are connected in parallel to equipment EG. In equipment EIC an earth is applied to one of the terminals of the relays *dr* and *dq* windings. If relay *dq* is considered, it can be seen also that the other terminal of its winding is connected to *n* contacts AFF which are in turn connected, by means of separating diodes to *n* registering wires *enr*. Relay *dr* is connected in the same way to registering wire *eni*. As previously indicated, some of the contacts AFF are closed by the plugging-into the jacks of a panel, for displaying a fault configuration. Relay *dq* is therefore connected to some of the wires *enr*, while relay *dr* is connected to some of the *eni* wires.

At the moment relay *co* energizes, i.e. immediately after relay *bg*, selector SE is not yet positioned. The registering wires are not yet marked and there are found the battery potential through the windings of the memory relays such as *bn* and *bm*. Relays *dq* and *dr* can then energize. On the other hand, memory relays remain at rest because for relays *dq* and *dr* are provided very great resistance windings so that the current which circulates be insufficient to actuate the memory relays.

Relay *dx* is energized by *dq* 1 and *co* 5. It holds by *dx* 1 and *cd* 3 as soon as relay *cd* is at make. Relay *dv* is energized by *dr* 1. It holds by *dv* 1 and *cd* 3.

As the marking earths appears over the register wires, some of the separating diodes of equipment EIC are locked. If closed contacts AFF do not agree with the marked register wires at least one of the register wires to which are connected relay *dq* and relay *dr* remain negative, which enables the holding of these relays.

The individual equipment EIC supplies no signal. In the general equipment, when relay *bg* releases, in spite of contact *cd* 2 being open, the holding circuit of relay *bb* and the energization of relay *bc* can be established by contact *cj* 2 and the break contact of button RG. Relay *bc* calls the punching machine to set up a card.

If closed contacts AFF correspond to the registered information over wires *eni*, for example, relay *dr* releases, all the separating diodes to which it is connected being locked. The opening of contact *dr* 1 then breaks the short-circuit of the left hand winding of relay *dw* that can energize, contact *dv* 2 being closed in series with the left hand winding of relay *dv*. Relay *dw* is held immediately by its contact *dw* 1.

The closing of contact *dv* 4 applies an earth in the direction of wire *com* which can pass by contacts *dv* 3 and *dw* 3, both at make, but contact *dx* 3 being operated while contact *dy* 3 is at break, the circuit remains broken. The individual equipment EIC does not yet furnish a signal and the operation is resumed as described by the setting up of a punched card.

If the correspondence is good, relays *dr* and *dg* both release. Relay *dw* energizes as it did previously. Besides, the opening of contact *dq* 1 breaks the short-circuit of the left hand winding of relay *dy* which can energize in series with the left-hand winding of relay *dx*. Relay *dy* holds immediately by its contact *dy* 1.

Contacts *dx* 3 and *dy* 3 are both in turn in make position and the earth comes to wire *com* indicating the comparison between the displayed configuration by its contacts AFF and the information marked on the registration wires gives a positive result.

It will now be assumed that the fault considered is not to originate a punched card, because its cause is exterior to the exchange, for example. Consequently, by displaying the configuration, button RJ/AC was also depressed, the contact of which now connects the wire *com* to wire *rj*. The earth applied to wire *com* is therefore transmitted over wire *rj* and, by contact *co* 3 energizes relay *cj* which remains independent from relay *co* by its contacts *cj* 1.

Relay *cj* opens its contact *cj* 2. So that, when relay *bg* releases when its lag is spont and *bg* 3 opens, relay *bb* cannot hold and relay *bc* remains at rest. The opening of contact *bb* 2 withdraws the holding earth of the memory relays and the marking of registration wires. The memory relays release. The opening of contacts *bg* 5 and *bb* 3 release the general equipment EG causing the release of the individual equipment EIC.

All the circuits are released, without the information sent by the unit(s) in fault being registered on a punched card. However, the opening of contact *bg* 4 breaks the circuit of relay *aw* and causes the unlocking of register E and the associated units. So that finally, there remains no trace of the fault that is simply rejected by the incident registration system.

Now will be explained an alternative of the preceding case of operation. It has already been indicated that the registration wires *eni* may be used to receive the identity of the calling subscriber, supplied by the identifier IDF. A configuration can be displayed on equipment EIC which has not the calling subscriber's identity, when the fault to be rejected is produced whatever be the origin of the call.

In this case, relay *dr* is connected to no wire *eni*. Consequently, this relay always remains at normal, as well as relay *dv*, and relay *dw* never energizes.

It can then be seen that the comparison is concurred only with the information marked on wires *enr*. Relay *dq* energizes at each trouble and causes the energization of relay *dx*. Whatever be the information marked over wires *eni*, if the information marked on *enr* agree with the display, relay *dq* de-energizes, relay *dy* energizes and the earth is transmitted over wire *com* through contacts *dx* 4, *dv* 3 and *dw* 3 at normal and *dx* 3 and *dy* 3 at make.

It is obvious that the operation is the same, if the display is absent for the comparison relay *dq*, but present for *dr*.

In the operation that has been described the faults normally originate a punched card. The only faults rejected are those for which the individual equipment supplies a signal on wire *rj*, energizing relay *cj* of the general equipment EG and prevents on this account the energization of relay *bc* of the fault register END in charge of calling the punching machine PER.

The device the invention is concerned with enables also the adoption of the reverse operation. For this, button RG of the general equipment EG is pressed. It is also necessary to display fault configurations on individual equipment to set button RJ/AC in normal position thus connecting wire *com* to wire *ac*.

As previously described, at each trouble, relays *co* and *cd* of the general equipment energize. The opening of contact *cd* 2 removes the earth from the circuit of relay *bc*, as the contact of button RG has already broken the other circuit towards the earth. Consequently, if no individual equipment answers, rejecting the faults is systematic.

On the other hand, if an individual equipment notes the coincidence between the marked information and the displayed configuration the comparison earth is transmitted over wire *ac*. Through contact *co* 4, relay *cl* energizes. It holds independently from relay *co* by its contact *cl* 1.

The closure of contact *cl* 4 supplies an earth for maintaining relay *bb* and energizing relay *bc*. When relay *bg* has released, relay *co* also comes back to normal, but relays *bb, bc, cd, cl* remain at make. A punched card is set up. Then, relay *bd*, energizes and the opening of contact *bd* 1 causes the release as already described.

The detection of a coincidence by an individual comparison equipment therefore enables ordering the acceptation of a fault whereas the operation dictates to reject systematically all the faults. Thus can be observed particularly several troubles, without being crowded by numerous unutilizable cards, for example during the exchange's final inspection.

To the above operation description, it is necessary to add that during the setting up of a punched hard, relay *cl* being at make, contact *cl* 3 also causes the energization of relay *bz* in the fault register. The opening of contact *bz* 2 maintains broken the availability of the fault register. Contact *bz* 1 supplies an earth to replace the one of contact *bg* 4 to maintain relay *aw* of register E. The register is therefore unlocked by the sending an earth over wire *deb* only after the setting up of the punched cards, when relays *bb, cd, cl, bz, aw* release. A non important temporary locking therefore occurs because it concerns a reduced number of faults.

The control device of the invention enables making this locking permanent in a simple way. By depressing button BL, the earth supplied by the contact of this button and by contact *cl* 2 enables holding relays *dw, dv, dy, dz* of the individual equipments. The comparison earth therefore remains on wire *com*, connected to wire *ac* in the individual equipment that has noted the concordance. Relay *cl* is therefore held. It holds register *bz* which, by its contact *bz* 1 holds relays *aw*. Register E is not unlocked. The locking is permanent, depending on button BL. It disappears when the button is restored to normal position. Naturally, in this situation means can be provided to give the alarm and draw the attention of the maintenance personnel.

The example of locking that has just been given is then described whereas we assume the button RG is in make position, the faults being systematically rejected except those that are identified by the individual equipments of which buttons RJ/AC are then on AC. However, this locking example is also good if button RG is in break position and if the faults are systematically accepted, save those that are identified by the individual equipments the buttons RJ/AC of which are then on RJ. The configuration which causes locking on an individual equipment is displayed and button RJ/AC depressed on AC. When this individual equipment identifies the hunted fault, relay *cl* is energized. The locking is effected while a punched card is set up exactly in the way just described, the fact that button RG is at normal having no consequence.

While the principles of the invention have been described above in connection with specific apparatus and applications, it is to be understood that this description is made only by way of example and not as a limitation on the scope of the invention.

What is claimed is:

1. A fault registering system comprising:

means for detecting a fault, means for supplying information about the detected fault, means including a fault register connected to receive the information about the detected fault, said fault register including means for forming a temporary memory about the detected fault, a control device connected to said fault register, said control device including contacts for receiving a plug-in panel representing at least one fault configuration corresponding to at least one fault, comparison equipment in said control device for making a correlation between information in said fault register and information concerning a fault configuration as represented by the condition of the contacts, and means responsive to coincidence between the registered information and the fault configuration to control means for providing a permanent memory of the fault.

2. A fault registering system as in claim 1, in which said means responsive to coincidence between the registered information and the fault configuration includes control means for locking out faulty units of the system.

References Cited

UNITED STATES PATENTS

| | | | |
|---|---|---|---|
| 2,688,656 | 9/1954 | Wright et al. | 340—149 |
| 2,985,368 | 5/1961 | Kohler et al. | 340—163 |
| 3,059,067 | 10/1962 | Gibson | 179—27 |
| 3,219,991 | 11/1965 | Freitas | 340—213.2 |

FOREIGN PATENTS

| | | |
|---|---|---|
| 651,279 | 10/1962 | Canada. |

KATHLEEN H. CLAFFY, Primary Examiner

ARTHUR A. McGILL, Assistant Examiner

U.S. Cl. X.R.

179—27; 340—213